United States Patent [19]
Woodman

[11] Patent Number: 5,699,939
[45] Date of Patent: Dec. 23, 1997

[54] METERING OF LIQUIDS

[75] Inventor: Peter Woodman, Johannesburg, South Africa

[73] Assignee: Biochlor (Proprietary) Limited, Sandton, South Africa

[21] Appl. No.: 633,790

[22] PCT Filed: Oct. 20, 1994

[86] PCT No.: PCT/GB94/02300

§ 371 Date: Jul. 1, 1996

§ 102(e) Date: Jul. 1, 1996

[87] PCT Pub. No.: WO95/11078

PCT Pub. Date: Apr. 27, 1995

[30] Foreign Application Priority Data

Oct. 21, 1993 [ZA] South Africa ............................ 93/7824
Aug. 4, 1994 [ZA] South Africa ............................ 94/5849

[51] Int. Cl.⁶ ...................................................... B67D 5/64
[52] U.S. Cl. .......................... 222/166; 222/463; 222/478
[58] Field of Search ................................ 222/185.1, 58, 222/77, 129, 166, 478, 463, 572

[56] References Cited

U.S. PATENT DOCUMENTS

| | | | |
|---|---|---|---|
| 2,554,050 | 5/1951 | Neubeck | 222/478 |
| 3,851,349 | 12/1974 | Lowder | 222/478 |
| 3,900,134 | 8/1975 | Larson | 222/166 |
| 4,042,150 | 8/1977 | Roos | 222/166 |
| 4,386,523 | 6/1983 | Vonk | 73/200 |

FOREIGN PATENT DOCUMENTS

| | | |
|---|---|---|
| 2322659 | 11/1974 | Germany. |
| 551084 | 2/1943 | United Kingdom. |
| 857306 | 12/1960 | United Kingdom. |
| 2209326 | 10/1989 | United Kingdom. |

*Primary Examiner*—Philippe Derakshani
*Attorney, Agent, or Firm*—Ladas & Parry

[57] ABSTRACT

A metering system 10 for metering liquid to be supplied to equipment which utilizes the liquid to generate a predetermined product includes a body member 12 which defines a chamber 14 therein, the body member 12 being mountable in a predetermined position relative to the equipment and liquid to be metered being received in the chamber 14. A discharge element is arranged in communication with the chamber of the body member, the discharge element comprising a first discharge element 16 through which a first metered volume is dischargeable to a first part of the equipment and a second discharge element 18 through which a second metered volume is dischargeable to a second part of the equipment.

12 Claims, 2 Drawing Sheets

METERING OF LIQUIDS

THIS INVENTION relates to the metering of liquids. More particularly, the invention relates to a metering system for metering liquid to be supplied to equipment which utilizes the liquid to generate a predetermined product. The invention has specific application in the metering of liquid to be supplied to electrolytic product generating equipment.

According to the invention, there is provided a metering system for metering liquid to be supplied to equipment which utilizes the liquid to generate a predetermined product, the metering system including a body member which defines a chamber therein, the body member being mountable in a predetermined position relative to the equipment and liquid to be metered being received in the chamber; and a discharge means in communication with the chamber of the body member, the discharge means comprising a first discharge element through which a first metered volume is dischargeable to a first part of the equipment and a second discharge element through which a second metered volume is dischargeable to a second part of the equipment.

The system may include a control means for controlling discharge of the liquid from the discharge means.

The body member may comprise a tray-like element which is displaceably mountable on the equipment. Preferably, the tray-like element includes a pivot-axis defining means or axle via which the tray-like element is mounted on the equipment to be pivotally displaceable relative to the equipment.

Then, the control means may comprise a counterweight mounted on the tray-like element on one side of the pivot-axis defining means with the chamber being arranged in the tray-like element on an opposed side of the pivot-like axis defining means.

A partition-like part may extend at least partially into the chamber to facilitate the metered discharge of the liquid through the discharge elements.

The tray-like element may be arranged such that the discharge elements extend from an operatively front wall of the tray-like element. Then, the partition-like part may extend from the front wall into chamber.

Further, the first discharge element may be arranged proximate a first end of the chamber and the second discharge element may be arranged proximate an opposed, second end of the chamber with the partition-like part then being mounted closer to the second discharge element.

In a preferred embodiment of the invention, a transverse, operatively vertical cross-section of the chamber may decrease from the first discharge element to the second discharge element such that less liquid is discharged through the second discharge element than through the first discharge element. The reduction in the cross-section may be achieved by having a part of a base of the chamber being arranged at an angled configuration with respect to the remainder of the base of the chamber. The angled part may extend from the first discharge element to the second discharge element.

Thus, it will be appreciated that, by selecting a suitable shape of container, a desired ratio of the first metered volume to the second metered volume discharged from the first discharge element and the second discharge element, respectively, may be obtained.

In another embodiment of the invention, the partition-like part may extend fully into the chamber to define two compartments in the chamber with a first compartment being larger than a second compartment, and the first discharge element being associated with the first compartment and the second discharge element being associated with the second compartment.

The metering system may includes a supply means for supplying a controlled supply of liquid to the chamber. The supply means may comprise a drip-feed device, such as a drip irrigation-type nozzle, for supply supplying liquid as a predetermined rate to the chamber. Further, the supply means may include a pressure control device in the form of a pressure reducing valve, arranged upstream of the drip-feed device, for controlling the pressure of the liquid supplied to the drip-feed device.

As indicated above, the invention is intended particularly for use with electrolytic product generating equipment. The generating equipment comprises a brine supply tank on which the metering system is pivotally mounted, at a top region of the tank. The brine supply tank is, in turn, mounted on an electrode tank. A supply conduit extends through the brine supply tank into the electrode tank. Then, the metering system is arranged on the brine supply tank such that, when the mass of liquid within the chamber exceeds that of the counterweight, the tray-like element pivots about the pivot axis of the axle and liquid is discharged from the first discharge element through the supply conduit into the electrode tank. Liquid from the second discharge element is discharged into the brine supply tank, initially, where it is mixed with a brine solution in the tank. Thereafter, the brine solution is fed through a brine filter in the supply conduit into the electrode tank for the electrolytic product generating process to be effected.

The invention is now described by way of example with reference to the accompanying diagrammatic drawings.

Figure 1:
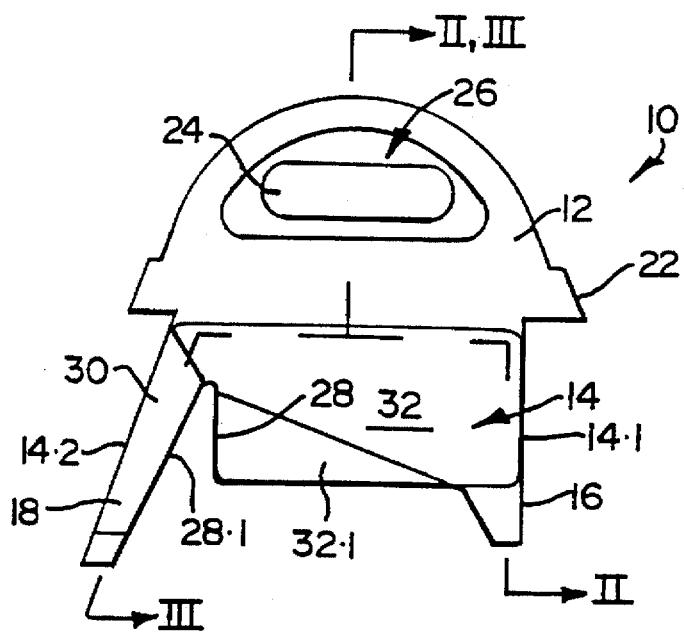
FIG. 1 shows a plan view of a metering system, in accordance with a first embodiment of the invention.
Figure 2:
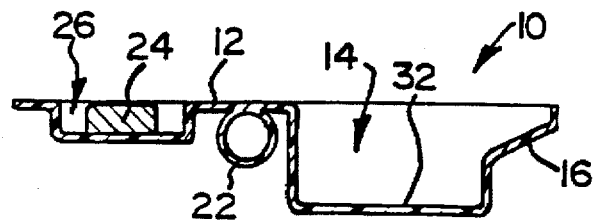
FIG. 2 shows a sectional side view of the system of FIG. 1 taken along line II—II in FIG. 1.
Figure 3:
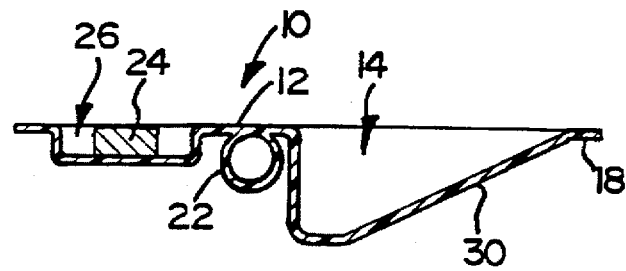
FIG. 3 shows a further sectional side view of the metering system taken along line III—III in FIG. 1.

Referring firstly to FIGS. 1 to 3 of the drawings, a metering system, accordance with a first embodiment of the invention, for metering liquid to be supplied to electrolytic product generating equipment, is illustrated and is designated generally by the reference numeral 10. The system 10 includes a container or tray-like element 12. The tray-like element 12 defines a chamber 14 therein.

The system 10 includes a discharge means comprising two discharge elements in the form of spouts 16 and 18. The spout 16 is arranged at a first end 14.1 of the chamber 14 with the spout 18 being arranged at an opposed, second end 14.2 of the chamber 14. The tray-like element 12 and the spout 16 and 18 are a moulding of a plastics material.

Figure 5:
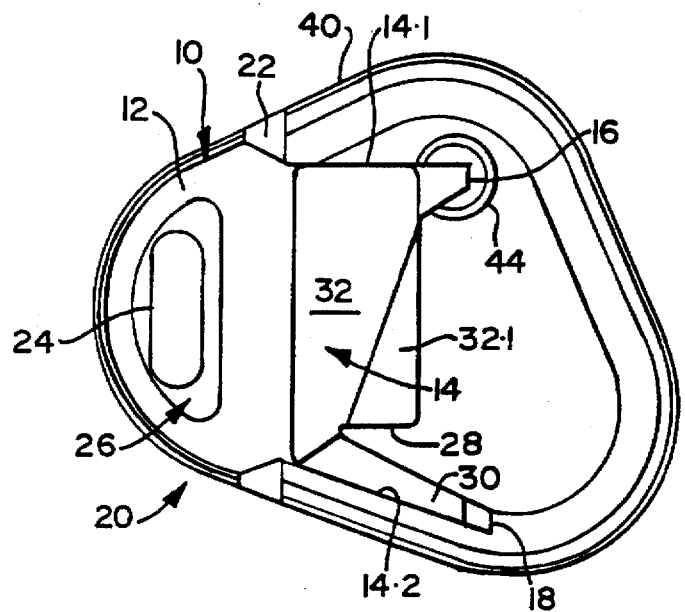
FIG. 5 shows a plan view of part of an electrolytic product generating equipment including the metering system of FIGS..1 to 3.
Figure 6:
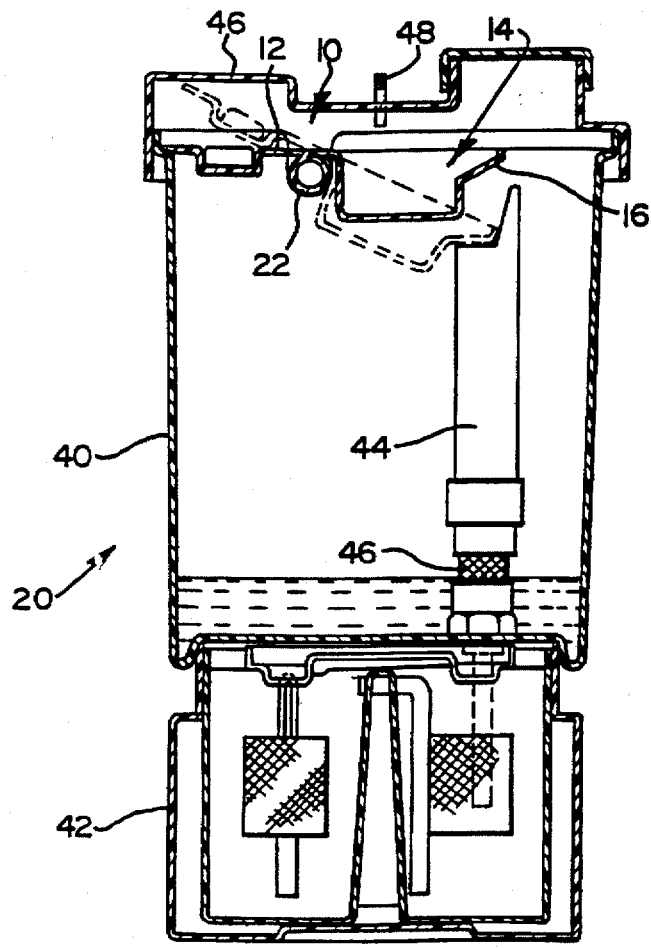
FIG. 6 shows a sectional side view of the electrolytic product generating equipment.

The tray-like element 12 is, in use, pivotally mounted on electrolytic product generating equipment 20, as shown in more detail in FIGS. 5 and 6 of the drawings. Thus, the tray-like element 12 has a pivot-axis defining means or axle 22 via which the tray-like element 12 is pivotally mounted on the electrolytic product generating equipment 20.

The metering system 10 includes a control means in the form of a counterweight 24. The arrangement is such that the counterweight 24 is received in a dished region 26 of the tray-like element 12 on one side of the axle 22 with the chamber 14 being arranged on an opposed side of the axle 22.

In the embodiment illustrated in FIGS. 1 to 3 of the drawings, a partition-like part 28 projects into the chamber 14 of the tray-like element 12. The arrangement is such that the discharge spout 16 is arranged at the side 14.1 of the chamber 14 with the discharge spout 18 arranged at and forming the other side 14.2 of the chamber 14. The part 28 is arranged in close proximity to the discharge spout 18 with a portion 28.1 of the part 28 forming part of the wall of the discharge spout 18.

Further, a floor 30 of the discharge spout 18 is angled, as shown more clearly in FIG. 3 of the drawings. Also, a base 32 of the chamber 14 has an angled part 32.1 which lies substantially co-planar with the angled floor 30 of the discharge spout 18. It is to be noted that the size of the angled part 32.1 increases from the first discharge spout 16 to the second discharge spout 18. In so doing, the transverse, vertical cross-sectional area of the chamber 14 decreases from the first discharge spout 16 to the second discharge spout 18. With this arrangement, the liquid contained in the chamber 14 is metered such that a first volume flows through the discharge spout 16 and a second volume flows through the discharge spout 18. The volume which flows through the discharge spout 16 is significantly higher than that which flows through the discharge spout 18.

Figure 4:
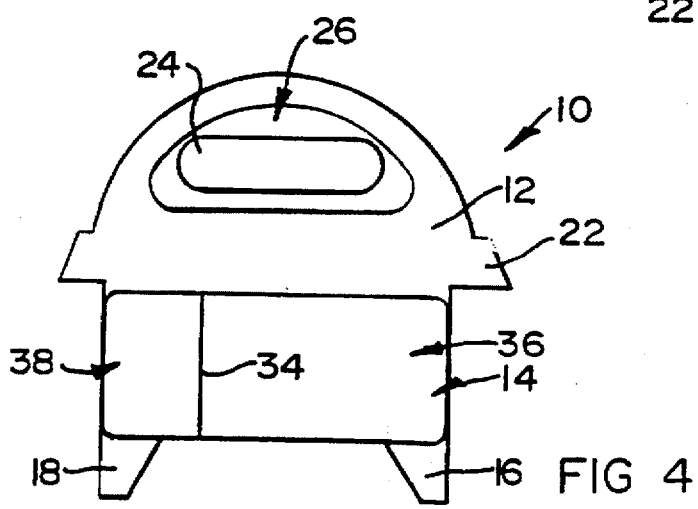
FIG. 4 shows a plan view of another embodiment of the metering system.

Referring now to FIG. 4 of the drawings, a plan view of another embodiment of the metering system 10 is illustrated. With reference to FIGS. 1 to 3 of the drawings, like reference numerals refer to like parts, unless otherwise specified.

In this embodiment of the invention, instead of the partition-like part 28, a partition 34 is provided extending the full width of the chamber 14 to divide the chamber into two compartments 36 and 38. The discharge spout 16 is associated with the compartment 36 with the discharge spout 18 being associated with the compartment 38. As illustrated, the compartment 36 is significantly larger than that of the compartment 38 and, as such, when the tray-like element 12 pivots downwardly about the pivot-axis of the axle 22, more liquid is discharged through the discharge spout 16 than through the discharge 18.

In use, and referring again to the embodiment of the invention illustrated in FIGS. 1 to 3 of the drawings, the metering system 10 is pivotally mounted, via its axle 22, on a brine supply tank 40 of the electrolytic product generating equipment 20. The brine supply tank 40 is, in turn, mounted on an electrode tank 42 where electrolysis of the liquid takes place to generate the required electrolytic product.

A supply conduit 44 for the electrode tank 42 projects into the brine supply tank 40 and terminates beneath the tray-like element 12 of the metering system 10. More particularly, the supply conduit 44 is arranged beneath the discharge spout 16. The brine supply tank is closed off by a lid 46. A supply means in the form of liquid inlet 48 is mounted in the lid 46 above the chamber 14 of the metering system 10.

The liquid inlet 48 comprises a drip-feed device in the form of a drip irrigation-type nozzle and a pressure reducing valve arranged upstream of the nozzle. The valve of the liquid inlet 48 controls the pressure of liquid supplied to the nozzle and maintain the liquid as a pressure of approximately 2 kPa (or less if the pressure of liquid upstream of the valve is less than 2 kPa). The feed rate of liquid from the nozzle of the liquid inlet 48 to the chamber 14 is selected in dependance on the concentration of sodium hypothlarite to be generated. Typically the nozzle is selected to have a feed rate of between approximately 1 l/hour, and preferably between 2 l/hour to 8 l/hour. The actual feed rate will be dependent on the pressure of liquid discharged from the pressur reducing valve.

In use, the liquid to be metered is fed via the inlet 48 into the chamber 14. The metering system 10 is in the position as shown in solid lines in FIG. 6 of the drawings.

As liquid is received within the chamber 14, the mass of liquid in the chamber 14 increases. Eventually, the mass of liquid in the chamber 14 reaches a critical value where it exceeds the mass of the counterweight 24. When this occurs, the tray-like element 12 tips to the position as shown in dotted lines in FIG. 6 of the drawings. Liquid contained within the chamber 14 is discharged through the discharge spout 16, into the supply conduit 44 and from there, into the electrode tank 42. Liquid is also discharged through the discharge spout 18. This liquid is discharged into the brine supply tank 40. The liquid or water in the brine supply tank 40 mixes with salt contained in the tank 40 and, thereafter, passes via a filter 46 into the electrode tank 42 where electrolysis of the water, mixed with the salt, takes place to generate sodium hypochlorite.

It is a particular advantage of the invention that a cost-effective metering system 10 is provided for metering quantities of water to be supplied to electrolyte product generating equipment. In particular, the metering system 10 does not require any valves, motors or electrical supply to operate.

I claim:

1. A metering system for metering liquid to be supplied to equipment which utilizes the liquid to generate a predetermined product, the metering system including a body member which defines a chamber therein, the body member being mountable in a predetermined position relative to the equipment and liquid to be metered being received in the chamber; and a discharge means in communication with the chamber of the body member, the discharge means comprising a first discharge element through which a first metered volume is dischargeable to a first part of the equipment and a second discharge element through which a second metered volume is dischargeable to a second part of the equipment.

2. The system as claimed in claim 1 which includes a control means for controlling discharge of the liquid from the discharge means.

3. The system as claimed in claim 2 in which the body member comprises a tray-like element which is displaceably mountable on the equipment.

4. The system as claimed in claim 3 in which the tray-like element includes a pivot-axis defining means via which the tray-like element is mounted on the equipment to be pivotally displaceable relative to the equipment.

5. The system as claimed in claim 4 in which the control means comprises a counterweight mounted on the tray-like element on one side of the pivot-axis defining means with the chamber being arranged on an opposed side of the pivot-axis defining means.

6. The metering system as claimed in claim 1 in which a partition-like part extends at least partially into the chamber to facilitate the metered discharge of the liquid through the discharge elements.

7. The metering system as claimed in claim 6 in which the first discharge element is arranged proximate a first end of the chamber and the second discharge element is arranged proximate an opposed, second end of the chamber with the partition-like part being mounted closer to the second discharge element.

8. The metering system as claimed in claim 7 in which a transverse, operatively vertical cross-section of the chamber decreases from the first discharge element to the second discharge element such that less liquid is discharged through the second discharge element than through the first discharge element.

9. The metering system as claimed in claim 6 in which the partition-like part extends fully into the chamber to define two compartments in the chamber with a first compartment being larger than a second compartment, and the first discharge element being associated with the first compartment and the second discharge element being associated with the second compartment.

10. The metering system as claimed in claim 1 which includes a supply means for supplying controlled supply of liquid to the chamber.

11. The metering system as claimed in claim 10 in which the supply means comprises a drip-feed device for supplying liquid at a predetermined rate to the chamber.

12. The metering system as claimed in claim 11 in the supply means includes a pressure control device for controlling the pressure of the liquid supplied to the drip-feed device.

* * * * *